（12) United States Patent
Volkmer et al.

(10) Patent No.: US 8,062,404 B2
(45) Date of Patent: Nov. 22, 2011

(54) FILTER INSERT

(75) Inventors: Daniel Volkmer, Dingolfing (DE); Jörg Meier, Unterschließheim (DE); Maximilian Grad, Marklkofen (DE); Johann Rackerseder, Aham (DE); Markus Weindl, Steinberg (DE); Micha Ammersdörfer, Frontenhausen (DE); Fritz Brenneis, Marklkofen (DE)

(73) Assignee: Mann+Hummel GmbH, Ludwigsburg (DE)

( * ) Notice: Subject to any disclaimer, the term of this patent is extended or adjusted under 35 U.S.C. 154(b) by 358 days.

(21) Appl. No.: 11/946,898

(22) Filed: Nov. 29, 2007

(65) Prior Publication Data

US 2008/0120953 A1 May 29, 2008

(30) Foreign Application Priority Data

Nov. 29, 2006 (DE) .................... 20 2006 018 187 U

(51) Int. Cl.
*B01D 46/00* (2006.01)
(52) U.S. Cl. .......................................... 55/497; 55/502
(58) Field of Classification Search .................. 55/490, 55/497, 502
See application file for complete search history.

(56) References Cited

U.S. PATENT DOCUMENTS

| 2,058,669 | A | * | 10/1936 | Dollinger | 55/499 |
|---|---|---|---|---|---|
| 3,385,034 | A | * | 5/1968 | Farr | 55/337 |
| 3,834,134 | A | * | 9/1974 | McAllister | 55/378 |
| 4,204,846 | A | * | 5/1980 | Brenholt | 96/425 |
| 4,439,219 | A | * | 3/1984 | Lambrecht | 55/499 |
| 4,692,177 | A | * | 9/1987 | Wright et al. | 55/499 |
| 5,013,438 | A | * | 5/1991 | Smith | 210/455 |
| 5,022,901 | A | * | 6/1991 | Meunier | 96/134 |
| 5,509,950 | A | * | 4/1996 | van de Graaf et al. | 55/486 |
| 6,045,598 | A |   | 4/2000 | Fath et al. | |
| 6,267,796 | B1 | * | 7/2001 | Schottmer | 55/502 |
| 6,383,268 | B2 | * | 5/2002 | Oda | 96/134 |
| 6,406,509 | B1 | * | 6/2002 | Duffy | 55/492 |
| 6,454,826 | B2 | * | 9/2002 | Fath et al. | 55/490 |
| 6,740,136 | B2 | * | 5/2004 | Duffy | 55/497 |
| 7,261,757 | B2 | * | 8/2007 | Duffy | 55/502 |
| 7,503,954 | B2 | * | 3/2009 | Haefner et al. | 55/502 |
| 2003/0172633 | A1 | * | 9/2003 | Duffy | 55/495 |
| 2006/0000197 | A1 | * | 1/2006 | Haefner et al. | 55/521 |
| 2006/0037296 | A1 | * | 2/2006 | Duffy | 55/495 |
| 2008/0115474 | A1 | * | 5/2008 | Volkmer | 55/497 |

\* cited by examiner

*Primary Examiner* — Duane Smith
*Assistant Examiner* — Amber Orlando

(57) ABSTRACT

A filter insert insertable seal-tightly into a filter housing has a filter element having end faces. At least one of the end faces of the filter element is engaged by a reinforcement clamp provided with a sealing element. The reinforcement clamp and the sealing element together form a single integral component. The sealing element has an outer sealing section that is connected to the reinforcement clamp so as to be movable relative to the reinforcement clamp.

9 Claims, 2 Drawing Sheets

FILTER INSERT

BACKGROUND OF THE INVENTION

The invention relates to a filter insert that is insertable in a seal-tight way into a filter housing and comprises a filter element having at least one end face that is engaged by a reinforcement clamp on which a sealing element is arranged.

U.S. Pat. No. 6,045,598 discloses a filter insert that comprises a pleated (folded) filter and is insertable into a filter housing. The end faces of the pleated filter are engaged by shape-stabilizing clamp-shaped reinforcement elements on which a seal is integrally formed that will rest with elastic tension seal-tightly against the housing wall of the filter housing when the filter insert is inserted. In order to achieve an inexpensive manufacture, the reinforcement element and the seal are combined to a single integral component. Because the reinforcement element and the seal are made of the same material and because it must be ensured that the seal can be elastically prestressed, a relatively soft and yielding material must be selected. If this is not the case, the required sealing properties cannot be realized.

SUMMARY OF THE INVENTION

It is an object of the present invention to provide by simple constructive measures and in an inexpensive way a filter insert that can be inserted seal-tightly into a filter housing. According to a further aspect of the invention, expediently a radial as well as axial sealing action is to be achieved with simple means.

In accordance with the present invention, this is achieved in that the reinforcement clamp and the sealing element form a single component and the sealing element has an outer sealing section that is connected to the reinforcement clamp wherein the outer sealing section is movably connected to the reinforcement clamp.

Advantageously, the outer sealing section is connected by a film hinge to the reinforcement clamp. This means that a weakening of the material of the sealing element is realized to such an extent that, on the one hand, the outer sealing section is provided with excellent movability and, on the other hand, the springy properties are sufficient to achieve an excellent sealing action.

In an alternative embodiment, the material of the sealing element and of the reinforcement clamp are different. For example, the reinforcement clamp is made from a hard plastic material component and the sealing section is made of a soft plastic material component. Both elements are manufactured by a two-component injection molding process. In one embodiment of the reinforcement clamp and the sealing section, at the transitional area between the hard plastic material component and the soft plastic material component a predetermined bending location can be arranged, for example, in the form of a film hinge. The reinforcement clamp is advantageously glued or welded to the end face or the terminal side of the filter element. The filter element can be engaged at both opposite end faces by a reinforcement clamp provided with the sealing section, respectively.

In accordance with another advantageous embodiment, the reinforcement clamp extends at least partially across two folds of a zigzag-shaped folded filter element. In this way, it is possible to design especially the edge area of the reinforcement clamp with a stay that has a certain width and that extends across the second fold of the filter element counted from the end face.

Also, an air filter system and an air filter insert are proposed wherein the filter system comprises two housing parts that can be coupled to one another to form a housing that can be opened.

DESCRIPTION OF THE PREFERRED EMBODIMENTS

Figure 1:
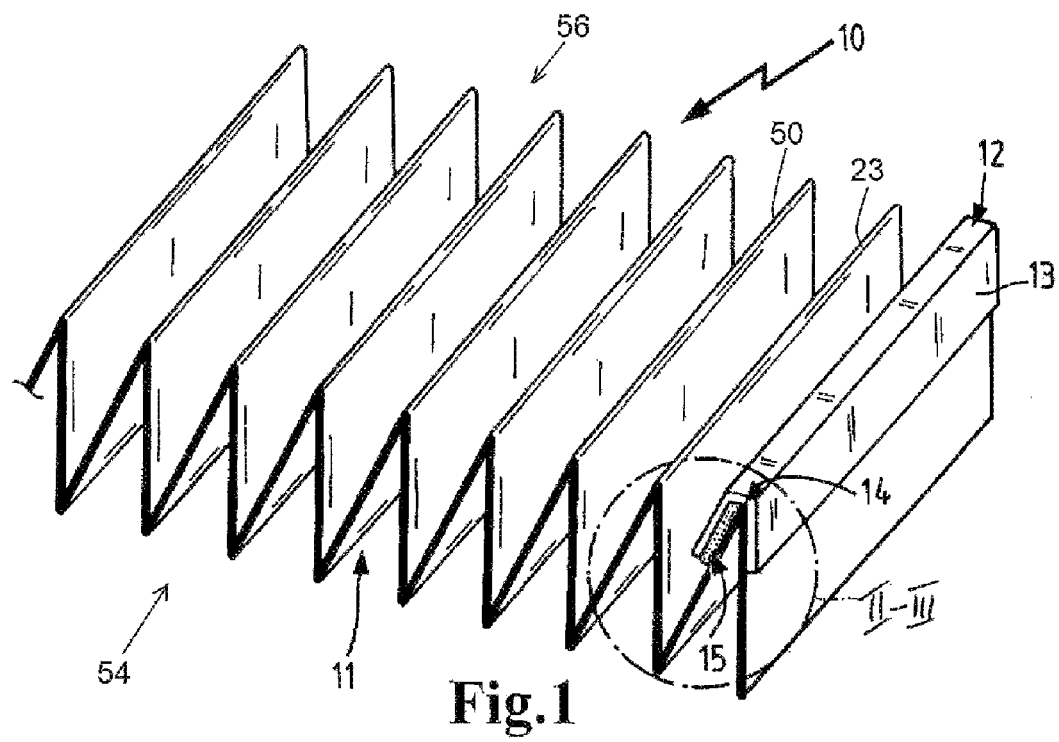
FIG. 1 is a perspective view of a first embodiment of a filter insert according to the invention.

FIG. 1 shows a filter insert 10 that is comprised of a zigzag-folded (pleated) filter medium 11 whose folds have a certain uniform spacing relative to one another. At the right side of the filter insert 10 a reinforcement clamp 12 is provided that has a sealing element 13. The reinforcement clamp 12 and the sealing element 13 form a single integral component. The reinforcement clamp 12 rests on the last fold tip 14 of the filter element 11 and is connected by gluing or welding to the filter element 11 as illustrated by the adhesive connection or weld connection 15. Preferably, the adhesive or weld connection 15 extends across the entire length of the reinforcement clamp 12. In the illustrated embodiment of FIG. 1, the outer sealing element 13 extends between the third side end face 54 and opposing fourth side end face 56 of the filter insert 10.

Figure 2:
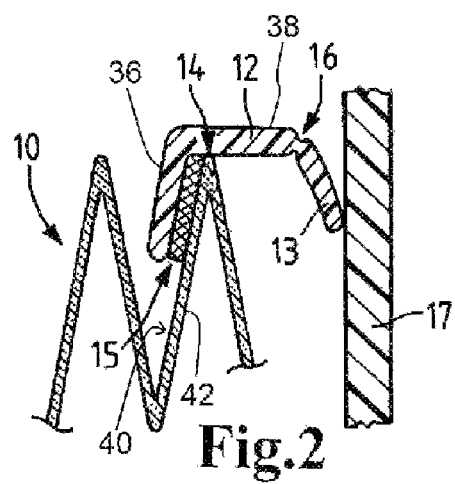
FIG. 2 shows detail II-II of FIG. 1 in a first variant.

FIG. 2 shows the detail II-III of FIG. 1 in a first variant; same parts are referenced with same reference numerals. The first clamp portion 36 of the reinforcement clamp 12 is attached to the inward facing surface 40 of the pleat 42 by means of an adhesive connection 15. The first clamp portion is shown arranged on and extending outwardly on the inward facing surface 40 of the pleat 42 to abut the fold tip 14 of the pleat 42. The second clamp portion 38 is secured at one end with an end of the first clamp portion 36. The second clamp portion 38 extends from the first clamp portion 36 in a direction parallel to and along the flow face (i.e., the plane of pleat fold tips 14, 23, 50 etc. in FIG. 1) at the upper side of the filter insert 10. In this section illustration, it can be seen that a film hinge 16 is arranged between the reinforcement clamp 12 and the sealing element 13. The material of this sealing system is, for example, a polyamide or polypropylene material which can be produced by extrusion or by injection molding. The film hinge has excellent elastic properties so that the sealing element rests tightly against the contact wall 17 (only schematically illustrated) and ensures seal-tightness between the contact wall 17 and the sealing element 13 or the filter insert 10.

Figure 3:
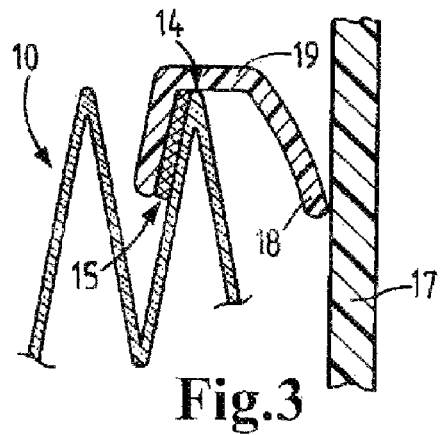
FIG. 3 shows the detail II-III of FIG. 1 in a second variant.

FIG. 3 shows the detail II-III in a variant of the system illustrated in FIG. 2. Instead of a film hinge for generating the elastic properties for the sealing action of the filter insert, the sealing element 18 is comprised of a soft plastic material that is connected to a hard plastic material component 19 that forms the reinforcement clamp. The two plastic materials can also be produced by extrusion or by two-component injection molding. There is also the possibility of providing the sealing element 18 with an additional elastic component (not illustrated) by a constructive measure, for example, by forming a sealing lip at the leading end.

Figure 4:
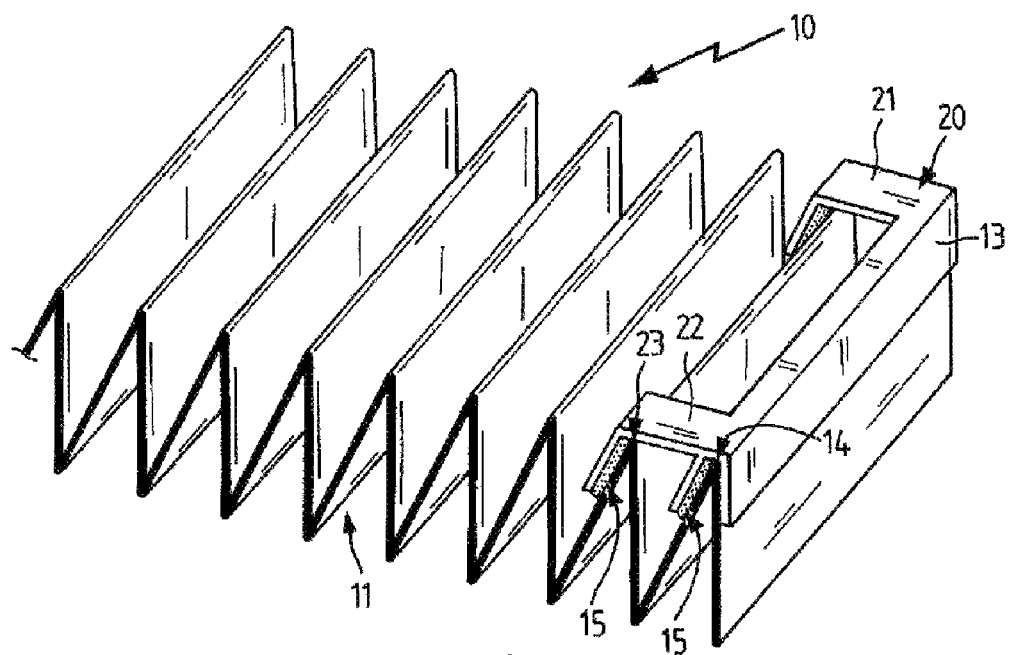
FIG. 4 is a perspective view of a second embodiment of a filter insert according to the invention.

FIG. 4 shows a filter insert 10 with a reinforcement clamp 20 that is provided with a sealing element 13. The reinforcement clamp 20 extends not only across the first fold tip 14 but also into the lateral areas by means of stays 21, 22 and across the second fold tip 23 counted from the end face. At the first fold tip 14 as well as the second fold tip 23 the reinforcement clamp 12 is provided with an adhesive connection 15. Of course, it is also possible to provide only spot gluing, in particular on the fold tip 14 across the entire length of the reinforcement clamp.

The advantage of this configuration resides in that a tilting of the reinforcement clamp is not possible. Essentially, the configuration leads to an additional stabilization of the entire sealing system.

Figure 5:
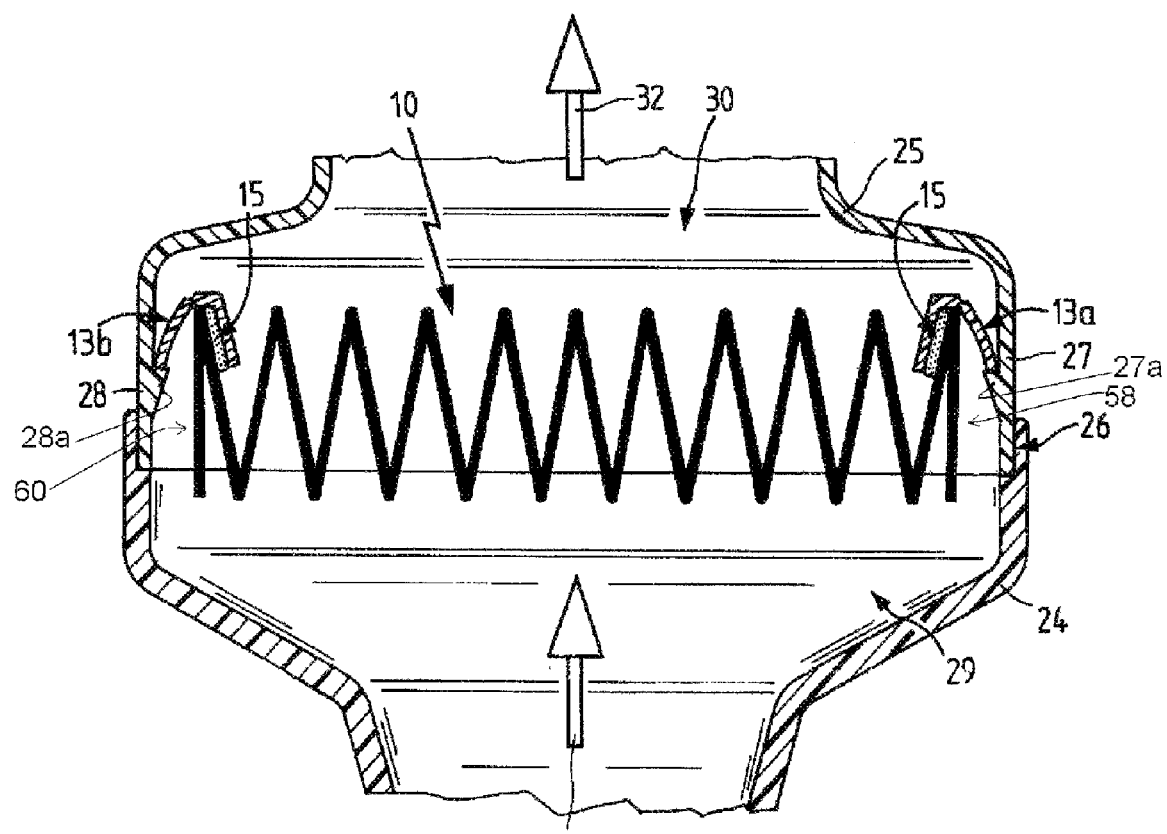
FIG. 5 shows an air filter system with a filter insert according to the invention.

FIG. 5 shows the mounting situation of a filter insert 10 in an air filter system. This air filter system comprises a housing that is comprised of a bottom part 24 and a top part 25. Both parts 24, 25 are locked with one another or screwed together at the connecting area 26 so that the housing can be opened for inserting the filter insert. it is also possible that one or both housing parts have an opening for inserting the filter insert. As shown in FIG. 5, the zig-zag folded filter media forms a series of pleats arranged in a spaced fashion spaced between opposing first side end face 58 and second side end face 60 with each pleat having an inwardly facing surface and an opposing outwardly facing surface, wherein the inwardly facing pleat surface is the pleat surface facing away from nearest one of the first 58 or second 60 side end faces.

The top part 25 of the housing receives the filter insert 10 and the filter insert 10 rests with its sealing elements 13a, 13b against the sidewalls 27, 28 of the top part 25—preferably, on hook-shaped supports 27a, 28a—and ensures in this area a reliable sealing action. On the other sides of the filter insert, further sealing elements, for example, foam material seals or nonwoven seals can be provided so that a reliable sealing action between the unfiltered air space 29 and the filtered air space 30 is provided. The air to be filtered flows according to arrow 31 into the system, passes through the zigzag-folded filter insert 10, and exits according to the arrow 32 as filtered air from the filter system.

The air filter system can be used, for example, for supplying fresh air to the interior of a motor vehicle.

The specification incorporates by reference the entire disclosure of German priority document 202006018187.3 having a filing date of Nov. 29, 2006.

While specific embodiments of the invention have been shown and described in detail to illustrate the inventive principles, it will be understood that the invention may be embodied otherwise without departing from such principles.

What is claimed is:

1. A filter insert insertable seal-tightly into a filter housing, the filter insert comprising:
   a filter element having an inlet face at an unfiltered side and an outlet face at a filtered side of said filter element, said filter element including
      a zig-zag folded filter media, said zig-zag folds forming a series of pleats, said pleats arranged in a spaced fashion spaced between opposing first and second side end faces of said filter element, adjacent ones of said pleats connected together by folds in said filter media positioned between said adjacent pleats, said folds each having a fold tip positioned at said inlet or said outlet face, said fold tips extending across said filter element to abut opposing third and fourth side end faces of said filter element,
      wherein each pleat has an inwardly facing surface defined as the pleat surface facing away from nearest one of said first or second side end faces;
   a reinforcing clamp including
      a first clamp portion having a face fully contacting and adhesively secured to said inwardly facing surface of a first one of said pleats between fold tips arranged on opposing edges of said first pleat, said first clamp portion arranged on and extending parallel to said inwardly facing pleat surface of said first pleat, said first clamp portion extending on said inwardly facing pleat surface outwardly in a first direction to abut one of said fold tips of said first pleat;
      a second clamp portion having opposing ends, one end of said second clamp portion secured to an end of said first clamp portion, said second clamp portion extending from said first clamp portion in a second direction parallel to and along said inlet face or said outlet face to abut said first side end face or said second side end face of said filter element, said second clamp portion also extending in a third direction aligned with a length of said fold tip of said first pleat to cover said fold tip of said first pleat between said third and fourth side end faces of said filter element; and
      an outer sealing element extending between said third and fourth side end faces of said filter element, said outer sealing element connected to the other end of said second clamp portion by a springy film hinge, wherein said outer sealing element is moveable by said film hinge relative to said second clamp portion;
   wherein said first clamp portion is connected to only one pleat of said pleated filter media,
   wherein said reinforcing clamp is not secured to an outward facing surface of the terminal pleat at said end faces;
   wherein the reinforcement clamp with the sealing element together form a single integral component.

2. The filter insert according to claim 1, wherein the first and second portions of the reinforcement clamp is a hard plastic material component and the sealing section is a soft plastic material component.

3. The filter insert according to claim 2, wherein a transitional area between the hard plastic material component and the soft plastic material component a predetermined bending location is provided.

4. The filter insert according to claim 1, wherein two oppositely positioned side end faces of the filter element are engaged by respective reinforcement clamps.

5. The filter insert according to claim 1, the second clamp portion of said reinforcement clamp extends across at least two adjacent fold tips proximate to one of said side end faces of the zigzag-folded filter element, wherein said reinforcing clamp further comprises
   a third clamp portion secured to an inwardly facing surface of a second one of said pleats between fold tips on opposing edges of said second pleat, said third clamp portion arranged on and extending parallel to said inwardly facing pleat surface of said second pleat, said third clamp portion extending on said inwardly facing pleat surface of said second pleat outwardly to abut one of said fold tips of said second pleat,
   wherein said second pleat is arranged between said first pleat and a nearest one of said first side end face or said second side end face of said filter element, and wherein one end of said third clamp portion is secured to said second clamp portion at a position between said first clamp portion and said sealing element.

6. An air filter system comprising:
a filter insert according to claim 1;
a housing comprising a first housing part for supplying air to be filtered and a second housing part for discharging the filtered air,
wherein the two housing parts are coupled to one another so that the housing can be opened for inserting the filter insert;
wherein at least one sealing section of the filter insert rests sealed-tightly against at least one wall of the housing.

7. An air filter system comprising:
a filter insert according to claim 1;
a housing comprising a first housing part for supplying air to be filtered and a second housing part for discharging the filtered air,
wherein at least one of the first and second housing parts has an opening for inserting the filter insert;
wherein at least one sealing section of the filter insert rests sealed-tightly against at least one wall of the housing.

8. The air filter system according to claim 6, wherein
said housing wall is an inner sidewall including a hook shaped support formed onto said sidewall of said housing and extending inwardly into an interior of said housing,
wherein said outer sealing element includes a second end arranged opposite to said outer sealing element end connected to said second clamp portion, and
wherein said second end of said outer sealing element rests on said hook-shaped support, said hook shaped support supporting said filter element in said housing.

9. The air filter system according to claim 7, wherein
said housing wall is an inner sidewall including a hook shaped support formed onto said sidewall of said housing and extending inwardly into an interior of said housing,
wherein said outer sealing element includes a second end arranged opposite to said outer sealing element end connected to said second clamp portion, and
wherein said second end of said outer sealing element rests on said hook-shaped support, said hook shaped support supporting said filter element in said housing.

* * * * *